Dec. 2, 1958   R. F. SCHEUERLE ET AL   2,862,985
ELECTRIC BATTERY PLATE
Filed Oct. 13, 1954

INVENTORS
ROBERT F. SCHEUERLE
GERALD T. MAHON

BY
*Edward J. Dwyer*
ATTORNEY 2,862,985

ELECTRIC BATTERY PLATE

Robert F. Scheuerle and Gerald T. Mahon, Philadelphia, Pa., assignors to The Electric Storage Battery Company, a corporation of New Jersey Application October 13, 1954, Serial No. 461,996

3 Claims. (Cl. 136—21)

The invention relates to plates for electric batteries and, more particularly, to positive plates for use in batteries utilizing silver oxide or silver peroxide, and zinc as the positive and negative active materials respectively in an alkaline electrolyte.

One of the standards for a satisfactory battery plate, particularly those designed for mobile applications in which high rates of discharge are required, is high electrical output for minimum space and weight of the plate. Thus, there is desired a plate presenting a large surface area for reaction with the electrolyte i. e. an extremely porous active material and yet one that is sufficiently strong from the mechanical standpoint to withstand handling and the like during production.

It is, therefore, an object of the invention to provide a silver positive plate that is highly porous and mechanically strong, and that will yield greater capacity per unit of space and weight than those heretofore known.

Another object of the invention is to provide an improved method of producing a silver positive plate having the above set forth characteristics, such method being more economical than those production methods currently or heretofore used.

Other objects of the invention will be apparent from the description and claims that follow.

In the battery industry, silver positive plates have heretofore been produced by several processes one of which is exemplified by United States Patent No. 2,615,930— J. D. Moulton et al. This process consists in making a paste of silver oxide and water, applying the paste to a screen, drying, sintering and pressing. Another process conventionally used has been to press silver powder onto a grid or conducting member and then sinter the compressed plate.

From the production standpoint there are grave disadvantages inherent in the first process particularly in the handling of the pasty material. Additionally the sintering with accompanying reduction of the silver oxide plate results in certain undesirable changes in the mechanical structure.

Insofar as the latter process is concerned, the intermediate product i. e., the pressed silver plate is distinguished by a lack of "green" strength, that is to say strength before sintering which makes handling during production extremely difficult. Additionally, it has been determined that to obtain any mechanical bond between particles of silver extremely high pressures must be used, such pressures resulting in a loss of surface area by producing one irregularly shaped particle out of several smaller particles. By such procedure also small particles will be so pressed together that a totally enclosed cavity will result to which the electrolyte cannot penetrate. Thus, the enclosed area can not enter into subsequent electrochemical reactions of the plate and electrical efficiency per unit of space and weight is decreased.

In avoidance of the disadvantages of the conventional processes set forth above it has been determined that if silver powder is first sintered and then pressed, certain great advantages will arise. These advantages will be discussed hereinafter in connection with the following description of the process and the positive plate produced thereby.

In the practice of the invention, silver powder is placed in a mold of any desirable high temperature resistant material. There have been used in the practice of the invention various silver powders having particle sizes ranging from those which will pass through a 50 mesh screen to those which will pass through a 325 mesh screen. Although the advantages of the invention are present when powder of the larger particles size is used, the advantages become progressively enhanced as particle size decreases. The mold cavity is so designed as to have a depth of slightly greater dimension than the desired thickness of the finished plate for reasons that will become apparent. After the powder has been levelled with the upper surface of the mold, high temperatures are applied to sinter the silver particles together. It has been determined that although a sinter bond between the particles can be obtained by the use of temperatures as low as 850° F. to 1000° F. for a period of about 20 minutes, the mechanical strength and handleability of the plate is markedly enhanced if temperatures in the range of from about 1000° F. to about 1400° F. are used with temperatures of from 1250° F. to 1400° F. being preferred. In this case, the time to produce the desired sinter bond decreases substantially to a period of about 10 minutes. It is possible, of course, and therefore within the purview of the invention to carry out the sintering step at temperatures approaching the melting point of silver, generally specified to be 1760° F. It will be understood that if the temperature is so increased the heating time will be decreased markedly below the 10 minute period specified above to preserve the desired porosity.

At this stage of the process, the sintered silver plaque is approximately 80% of its original thickness, contains substantially all its original porosity and is of a tough rubbery texture, particularly noticeable where the silver powder is of small particle size, permitting it to be sent and otherwise roughly handled without damage.

Figure 1:
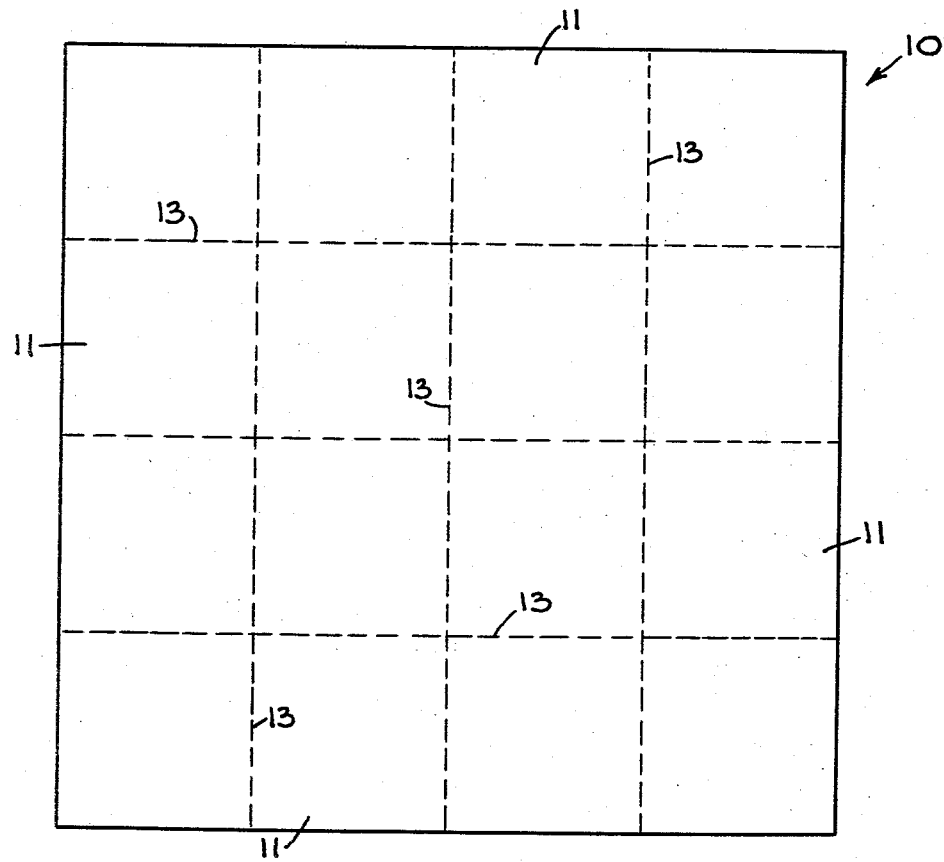
Figure 1 is an elevational view of a silver plaque representing an intermediate stage of the invention.

Referring now to the drawings. Figure 1 shows the sintered silver plaque 10. Plaque 10 has been produced in such dimensions as to be composed of a plurality of sections 11, such sections corresponding in length and width to the dimensions desired in the finished plate 12. Plaque 10 is of such texture that it can be sheared by any suitable means along dotted lines 13 to produce plates 12 which are then placed in a press. It will be understood that, if desired, said plaque can be produced in the size of the finished plate thus eliminating the shearing operation.

Figure 2:
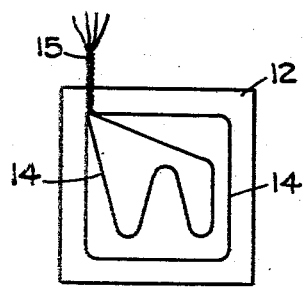
Figure 2 is an elevational view of a positive plate produced in accordance with the invention.

On top of each plate is placed a silver wire or wires 14 which may be of a configuration shown in Figure 2 to form a conducting grid, the ends of wires 14 extending beyond the edge of plate 12 and being conveniently twisted together to form plate lug 15. Pressure in an amount of from 0.5 ton to 3 tons per square inch and preferably about 1 ton per square inch is applied to plate 12, whereby wires 14 are embedded in plate 12 forming a mechanical bond between the wires and the plate, and the plate itself consolidated to its desired final thickness.

Plates made in accordance with the present invention have been assembled into rechargeable cells and tested in conjunction with cells containing plates conventionally produced but otherwise identical. The following Table I gives the results of tests of 49 plate cells i. e. 24 positives and 25 negatives, cell A containing positive plates made by the process set forth above and cells B, C, and D, containing positives produced by known processes.

Table I

|  | Charge voltage after 50 A. H. charge, volts | Fourth discharge voltage at 4 minutes, volts | Discharge after 28 days' stand D. C. time to 1.05 final voltage, minutes |
|---|---|---|---|
| Cell A | 1.90 | 1.345 | 6.35 |
| Cell B | 1.92 | 1.30 | 3.50 |
| Cell C | 1.92 | 1.325 | 4.07 |
| Cell D | 1.925 | 1.33 | 5.75 |

The cells tabulated above were initially charged at constant current for a total input of 50 ampere hours per cell. Since the cells under test contained separation between the plates comprising a type of diaphragm that is deleteriously affected as the charge voltage approaches two volts, total input was limited to this amount so as to maintain the voltage substantially below the critical figure. At the cut-off point the charge voltage of cell A was lower than any of the other cells indicating that it would readily accept additional charge. Thus cell A could be charged to a greater extent than the conventional cells before destructive charge voltage was reached whereby more capacity would be available for subsequent discharge.

The advantages of cell A are also shown in the other columns of Table I where, after a discharge for a fixed period, it showed higher voltage thus indicating residual useful capacity. Additionally, on discharge to a fixed final voltage after a 28 day stand an open circuit, cell A gave substantially greater capacity than the best of the other cells.

Table II sets forth test results of 13 plate cells i. e. 6 positives and 7 negatives, the positives of cell E being produced in accordance with the invention and those of cells F, G, H, and I having been produced by heretofore known processes. Since these cells are produced to meet different specifications than cells A–D the results listed in Table II are not directly comparable to those set forth in Table I.

Table II

|  | First discharge voltage at 9.00 minutes, volts | Second discharge time to 1.21 final voltage, minutes | Discharge after 30 day stand D. C. time to 1.21 final voltage, minutes |
|---|---|---|---|
| Cell E | 1.330 | 21.25 | 19.10 |
| Cell F | 1.285 | 20.00 | 7.00 |
| Cell G | 1.305 | 20.40 | 12.75 |
| Cell H | 1.315 | 21.00 | 15.45 |
| Cell I | 1.285 | 19.50 | 11.00 |

A review of the results listed above clearly indicate the superiority of cell E on discharges either for a fixed time or to a fixed final voltage.

It will be seen, therefore, that the objectives of the invention have been achieved and that there has been devised a new and improved method of producing a silver positive plate, the use of which method results in a new and improved plate over those that have heretofore been known in the art.

We claim:

1. A method of producing a positive plate for silver zinc batteries comprising the steps of heat treating unconsolidated silver powder in the absence of applied pressure at from about 850° F. to about 1400° F. for a period of 10 to 20 minutes thereby forming a plate of about 80% of the original thickness of said powder, the particles of silver powder being sintered together, applying to one face of said plate a conducting member of a thickness equivalent to that of the final product, and pressing said plate whereby said sintered powder is consolidated and said conducting member embedded therein.

2. The method of claim 1 in which the pressing step is carried out at a pressure of from about 0.5 to about 3 tons per square inch.

3. The method of claim 1 in which the heat treating step is carried out at a temperature of from about 1250° F. to about 1400° F. for a period of about 10 minutes.

References Cited in the file of this patent

UNITED STATES PATENTS

| 585,853 | Samuels | July 6, 1897 |
| 2,544,112 | Schneider | Mar. 6, 1951 |
| 2,615,930 | Moulton | Oct. 28, 1952 |
| 2,654,795 | Brill et al. | Oct. 6, 1953 |

FOREIGN PATENTS

| 1,875 | Great Britain | 1882 |
| 12,595 | Great Britain | Oct. 4, 1886 |